United States Patent [19]

Kreinberg

[11] Patent Number: 4,973,370

[45] Date of Patent: Nov. 27, 1990

[54] METHOD OF TERMINATING BRAIDED ELECTRICAL CABLE

[75] Inventor: Earl R. Kreinberg, Phoenix, Ariz.

[73] Assignee: AMP Incorporated, Harrisburg, Pa.

[21] Appl. No.: 454,560

[22] Filed: Dec. 21, 1989

[51] Int. Cl.⁵ .......................................... H01B 13/06
[52] U.S. Cl. ..................................... 156/50; 29/858; 29/866; 156/51; 174/74 R; 174/128.1; 174/129 R; 439/492
[58] Field of Search ..................... 29/858, 866; 156/50, 156/51; 174/74 R, 128.1, 129 R; 439/422, 426, 492, 497, 504

[56] References Cited

U.S. PATENT DOCUMENTS

| | | | |
|---|---|---|---|
| 4,241,498 | 12/1980 | Brandeau | 29/861 |
| 4,394,533 | 7/1983 | Naito | 174/74 R |
| 4,821,409 | 4/1989 | Nager, Jr. | 29/747 |
| 4,834,682 | 5/1989 | Auclair et al. | 439/883 |
| 4,859,204 | 8/1989 | Daly et al. | 439/424 |
| 4,867,700 | 9/1989 | Kreinberg | 439/422 |
| 4,902,245 | 2/1990 | Olsson | 439/492 |
| 4,915,650 | 4/1990 | Daly et al. | 439/498 |

OTHER PUBLICATIONS

Cooner Wire Company Catalog, "Braided Copper Cables", Chatsworth, Calif.
Newark Catalog No. 110, p. 881, products of SPC Technology, "Red Insulating Varnish", Newark Electronics.
Abstract & Drawings of Ser. No. 07/338,079.

Primary Examiner—Robert A. Dawson
Attorney, Agent, or Firm—Anton P. Ness

[57] ABSTRACT

Braided fine wire cable is prepared for termination by electrical terminals by a coating of dielectric material such as curable varnish which coats and embeds the myriad of fine wires. The coating upon hardening imparts structural integrity to the otherwise very flexible cable, enabling handling. The coating also retains the wire portions many of which may be severed during application of electrical terminals thereto to obtain electrical connection of portions of the terminals with ends or surfaces of many of the wires, thus preventing disintegration of the cable's termination region when the terminals are applied. The hardened coating also enables the cable region to be shaped and formed to some extent, even including cutting or notching the cable, to adapt the cable region to the structure of the terminals, enabling use of existing terminals used for terminating solid flat conductor cable, for example.

7 Claims, 2 Drawing Sheets

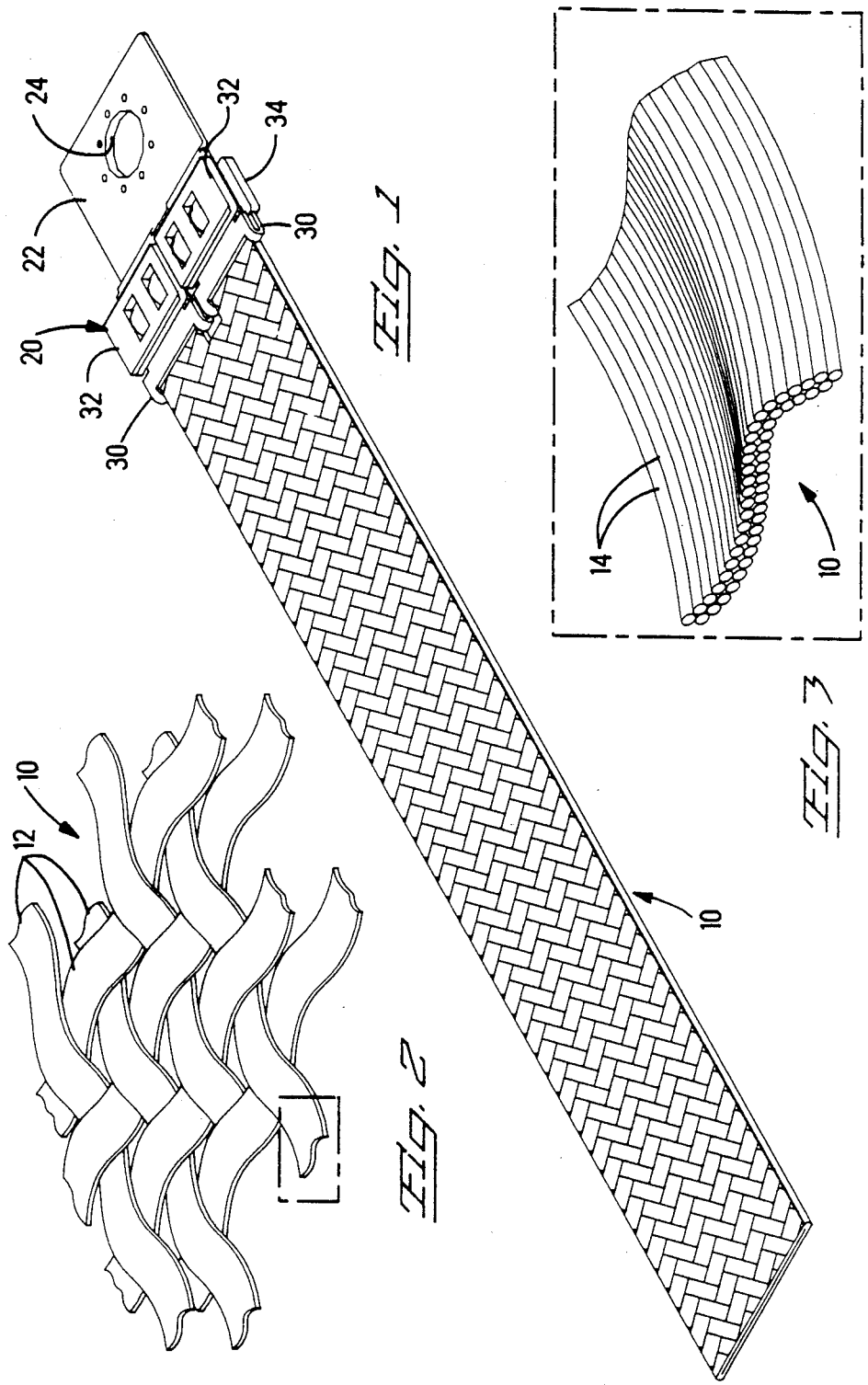

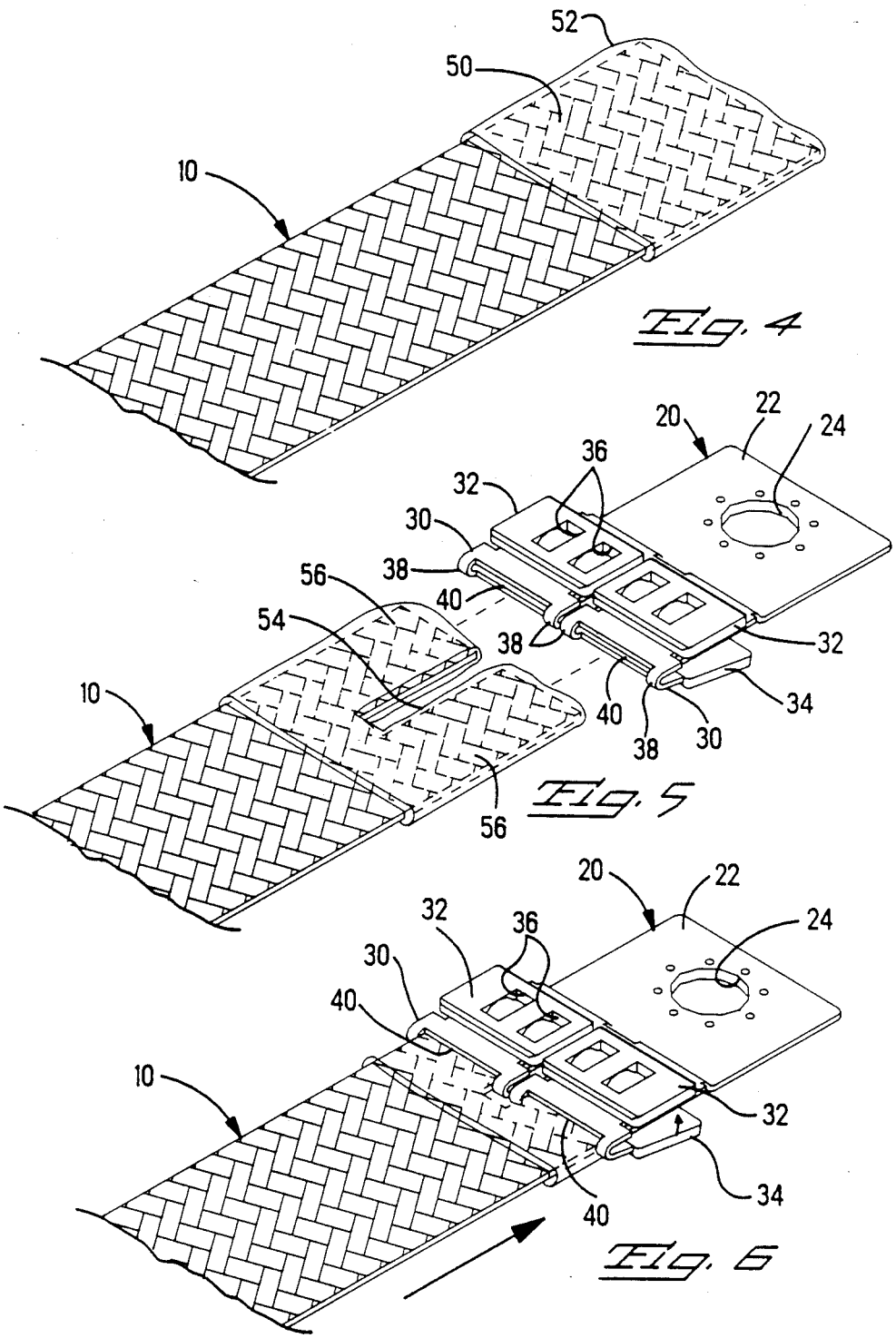

METHOD OF TERMINATING BRAIDED ELECTRICAL CABLE

FIELD OF THE INVENTION

The present invention relates to the field of electrical connections and more particularly to terminations of electrical cable.

BACKGROUND OF THE INVENTION

Certain electrical cable in commercial use consists of braided fine wire of bare, tinned or plated copper which is not coated with dielectric material. Such cable can be used in the form of a sleeve having continuous circumference to be disposed around other electrical conductor wires for shielding against electromagnetic interference (EMI) when it is connected to ground at its terminations. The braided construction enables the cable to be expanded locally by stretching, separating the braids such as to create an aperture therethrough. Such cable also can be used by itself for grounding one article to another especially across limited distances between the articles, such as an electrified gate along an electrified fence, where the gate must be pivotable about an axis with respect to a fence portion; the braided construction of the cable enables it to be quite flexible for flexing when the gate is pivoted. Other uses include an automotive application for grounding a battery to chassis ground, and also some continuous power transmission uses where the electrical connection is to remain visible. One source of commercially available braided cable is Cooner Wire Company, Chatsworth, Calif.

Prior art methods of termination included soldering and reflow soldering, wire barrel crimping and also the application of eyelets such as in U.S. Pat. No. 4,834,682.

It is desired to provide an improved method of terminating such cable with an electrical terminal for assuring that the cable is and remains electrically connected to another electrical conductive means during long-term in-service use.

It is also desired to provide a method of adapting braided fine wire cable for use with certain terminals of existing design.

U.S. Pat. Nos. 4,859,204 and 4,867,700 disclose a transition adapter which is crimped onto a flat power cable by penetrating the insulation covering the cable's conductor and also shearing through the conductor at a plurality of locations. The cable is of the type entering commercial use for transmitting electrical power of for example 75 amperes nominal, and includes a flat conductor one inch wide and about 0.020 inches thick with an extruded insulated coating of about 0.004 to 0.008 inches thick over each surface with the cable having a total thickness averaging about 0.034 inches. U.S. Pat. No. 4,915,650 discloses a similar transition adapter separable into two discrete adapters which is especially useful with dual conductor flat cable, wherein a pair of parallel spaced coplanar flat conductor strips having insulation extruded therearound define power and return paths for electrical power transmission. The adapters have opposed plate sections disposed along respective major surfaces of the cable, the plate sections including termination regions transversely thereacross having arrays of shearing wave shapes alternating with relief recesses of equal width. The wave shapes extending outwardly from the cable-proximate side and toward relief recesses in the opposed plate section, and when the plate sections are pressed together with the cable therebetween, the arrays of wave shapes shear the cable into strips and simultaneously press the sheared strips into the opposing relief recesses, forming a series of interlocking wave joints with the cable while exposing newly sheared edges of the cable conductor or conductors for electrical connection therewith. Low resistance copper inserts along the cable-remote surfaces of the adapters include wave shapes conforming to the adapter wave shapes so that the sheared conductor strips become disposed between sides of the insert wave shapes, as do the shearing edges of the adjacent wave shapes of the opposing adapter. Thereafter a staking process deforms the metal of the low resistance copper inserts against the conductor edges to define gas-tight, heat and vibration resistant electrical connections with the cable conductor and with the transition adapter, so that the inserts are electrically in series at a plurality of locations between the conductor and the adapter. A contact section is integrally included on the transition adapter and extends from the now-terminated cable end, enabling mating with corresponding contact means of an electrical connector, or a bus bar, or a power supply terminal, for example.

SUMMARY OF THE INVENTION

The method of the present invention is directed to preparing cable for termination by electrical terminals, where the cable is of the type constituting a plurality of braided arrays of fine conductive wires not coated by or embedded in insulative material, comprising the step of selecting a region of the cable to be terminated by terminal means, and embedding the plurality of wires in the selected region with a dielectric material. Afterward the plurality of wires are adhered together locally by the dielectric material, whereby the cable region is provided with and thereafter retains substantial structural integrity sufficient to support the terminal means after termination thereby. Additionally the wires substantially remain adhered within said region after termination by the terminal means even if wire portions are severed from remaining lengths of at least some of the plurality of wires by application of the terminals. It is also believed that the coating may assist in providing stored energy pressing the exposed wire portions against adjacent surfaces of the terminals, facilitating the electrical connection. The dielectric material may be a curable liquid which hardens substantially to a solid after application to said cable region, and may be sprayed onto the cable region, or the cable region may be dipped into a quantity of the liquid.

The method may also include further preparation of the cable region prior to termination by shaping and forming the region to adapt it to the terminals to facilitate termination specifically by terminals otherwise useful for solid flat conductor cable. For example, the cable region may be a cable end and an axial slot is cut thereinto extending inwardly from the cable end to define a pair of tab portions insertable into laterally spaced slots at rearward ends of lateral sections of the terminals and between respective upper and lower structures of the lateral sections, whereafter said upper and lower structures are pressable together to penetrate the dielectric material and shear at least some of the wires to expose portions of at least some of the wires to establish electrical engagement between the exposed wire portions and the terminals. Certain such terminals have upper and lower arrays of interdigitating wave shapes for shearing the cable at a plurality of parallel spaced locations across the cable width, and establishing assured electrical connections with the exposed metal of the sheared myriad of fine wires which comprise the cable conductor means, without the cable locally disintegrating upon its fine wires being severed upon shearing. The terminals are adapted to penetrate thin dielectric coating material of cables upon being pressed thereagainst, thus cutting or tearing through it to reach the metal conductor therewithin and then shear the metal conductor to establish an electrical connection therewith. The coating also rigidifies the cable end to be handled as the end of a solid flat cable.

In one version of the method where the terminal comprises a side-by-side pair of sections each having upper and lower structures, the varnish-coated cable end is further prepared by shearing from the cable end an axial slot of limited width along the center of the cable, thus defining a pair of tab portions; the tab portions are insertable into respective rearward slots of the respective terminal sections to be disposed between the respective upper and lower structures which initially diverge forwardly of the slots, whereafter the upper and lower structures are rotated about integral hinge straps defining the ends of the pair of slots and are compressed together for the arrays of opposing wave shapes to penetrate the varnish-coated tab portions and shear the fine wires embedded therewithin to establish a plurality of electrical connections. In this method the close-fitting inside edges of the hinge straps are deformed against the outwardly facing edges of the tap portions to bite slightly thereinto and form mechanisms to resist axial movement of the terminals with respect to the cable.

It is an objective of the present invention to provide a method for assured termination of braided fine wire cable by terminals necessitating shearing or severing of at least some of the fine wires.

It is also an objective to provide a method for using terminals of conventional design for solid flat conductor cable, with braided fine wire cable.

An embodiment of the method of the present invention will now be discussed with reference to the following drawings.

BRIEF DESCRIPTION OF THE DRAWINGS

FIG. 1 is an end of a braided fine wire cable having a terminal terminated onto an end thereof;

FIGS. 2 and 3 are enlarged views of the cable of FIG. 1 showing the braid structure and the fine wire thereof respectively; and FIGS. 4 through 6 illustrate the method of preparing the cable end and applying thereto the terminal of FIG. 1.

DETAILED DESCRIPTION OF THE PREFERRED EMBODIMENT

Braided fine wire cable 10 constitutes braids 12 each comprising flat bundles of continuous lengths of fine wires 14, and usually is fabricated in a sheath or sleeve form which is shown collapsed in the FIGS. Many varieties of such braided cable is sold for example by Cooner Wire Company, Chatsworth, California; one such product is Part No. NE 2432307, AWG Size 1, 1 inch wide. A terminal 20 has been terminated onto the end thereof and includes a tongue or blade contact section 22 extending forwardly therefrom having a post-receiving aperture 24 for being fastened to a post (not shown) of a grounding means such as by being secured by a nut threaded onto the post atop tongue 22, as is known.

Terminal 20 shown includes a pair of laterally spaced terminating sections 30 of the type disclosed in greater particularity in U.S. Pat. No. 4,915,650. Each terminating section 30 includes upper and lower structures 32,34 having interdigitated wave-shaped bosses (not shown) which extend toward the other structure to be received into corresponding relief apertures 36 of the other structure. The upper and lower structures of each section 30 extend forwardly from rearward ends each constituting a pair of spaced hinge straps 38 defining therebetween a slot 40 of known width. When tab sections of a cable are formed having substantially the same width as slots 40 and are inserted through slots 40, the upper and lower structures are rotated toward each other. The wave-shaped bosses engage the cable surfaces, shear the cable into strips, and press the sheared strips into the opposing relief apertures of the opposing structure forming an array of wave joints in which sheared cable conductor edges engage adjacent edges of the metal terminal to form a plurality of electrical connections, as described with more particularity in U.S. Pat. No. 4,867,700 which is incorporated hereinto by reference.

Were such terminals to be applied to the braided fine wire cable 10 without preparation, a myriad of short discrete wire lengths would be formed which would scatter, essentially disintegrating the cable end.

According to the method of the present invention, the cable end 50 is prepared as shown in FIG. 4 by applying a liquid coating 52 thereto such as by spraying or preferably dipping the cable end 50 assuring that the liquid flows between the braids 12 and between the individual fine wires 14 and adheres them together, as well as coating the outwardly facing surfaces; the coating then is permitted to cure or harden. The coated cable portion then may be handled in the same manner as the end of a length of solid flat cable. The cable can be further prepared for use with the terminal 20 by having an axial slot 54 punched thereinto of controlled width so that the inner hinge straps 38 of terminal 20 just fit therein, defining tab sections 56, as shown in FIG. 5. Tab sections 56 are then inserted through slots 40 of lateral sections 30 of terminal 20, after which upper and lower structures 32,34 of lateral terminal sections 30 are pressed firmly together for their arrays of wave-shaped bosses to shear the coated cable into strips and press the strips into opposing apertures 36 for fine wire portions exposed by the shearing to be disposed against the side edges of apertures 36 establishing a plurality of electrical connections sufficient for grounding connections to be formed or for small cycle power transmission. The coating assists in resisting corrosion of the electrical connections.

One example of liquid coating material 52 is a tough, flexible high adhesion V-0 rated flame-retardant varnish such as SPRAYTEC brand Red Insulating Varnish, Type 32N510 sold by SPC Technology, Chicago, Illinois. The liquid material as initially applied is preferred to be watery enough to flow between wire strands, and then cure quickly to a somewhat rigid film and be non-corrosive.

As shown and described, the termination may be performed with minimal simple tooling remote from a manufacturing facility. However, the termination of FIG. 1 may be further subjected to wave splitting and insert staking in accordance with the teachings of U.S.

Pat. No. 4,859,204 to enhance the mechanical and electrical characteristics of the termination, when appropriate apparatus is available at the site of the terminating procedure. The varnish-encoated cable end retains sufficient solid integrity for sheared cable strips to remain integral with the cable at the ends of the parallel shears, to support such additional processing of the termination.

Other terminals of somewhat different designs may be used with the method of the present invention which involve shearing at least some of the fine wires, which would be within the spirit of the invention and the scope of the claims.

What is claimed is:

1. A method of preparing cable for termination by electrical terminals, where the cable is of the type constituting a plurality of braided arrays of fine conductive wires not coated by or embedded in insulative material, comprising the steps of:

selecting a region of the cable to be terminated by terminal means; and embedding the plurality of wires in said selected region with a dielectric material of the type which flows between at least most of the individual wires prior to solidifying whereafter the plurality of wires are adhered together locally by said dielectric material, whereby said cable region is provided with and thereafter retains substantial structural integrity sufficient to support said terminal means after termination thereby and said wires substantially remain adhered within said region after termination by said terminal means even if wire portions are severed from remaining lengths of at least some of said plurality of wires by application of said terminal means to said cable region.

2. The method of claim 1 wherein said dielectric material is a curable liquid which hardens substantially to a solid after application to said cable region.

3. The method of claim 2 wherein said liquid is sprayed onto said cable region.

4. The method of claim 2 wherein said cable region is dipped into a quantity of said liquid.

5. The method of claim 2 wherein said liquid is flame-resistant varnish.

6. The method of claim 1 wherein said cable region is further prepared prior to termination by shaping and forming said region to adapt said region to said terminal means to facilitate termination of said terminal means thereto.

7. The method of claim 6 wherein cable region is a cable end and said shaping and forming includes cutting an axial slot extending inwardly from said cable end to define a pair of tab portions insertable into laterally spaced slots at rearward ends of lateral sections of said terminal means and between respective upper and lower structures of said lateral sections, whereafter said upper and lower structures are pressable together to penetrate said dielectric material and shear at least some of said wires to expose portions of said at least some of said wires to establish electrical engagement between said exposed wire portions and said terminal means.

* * * * *